Figure 1:
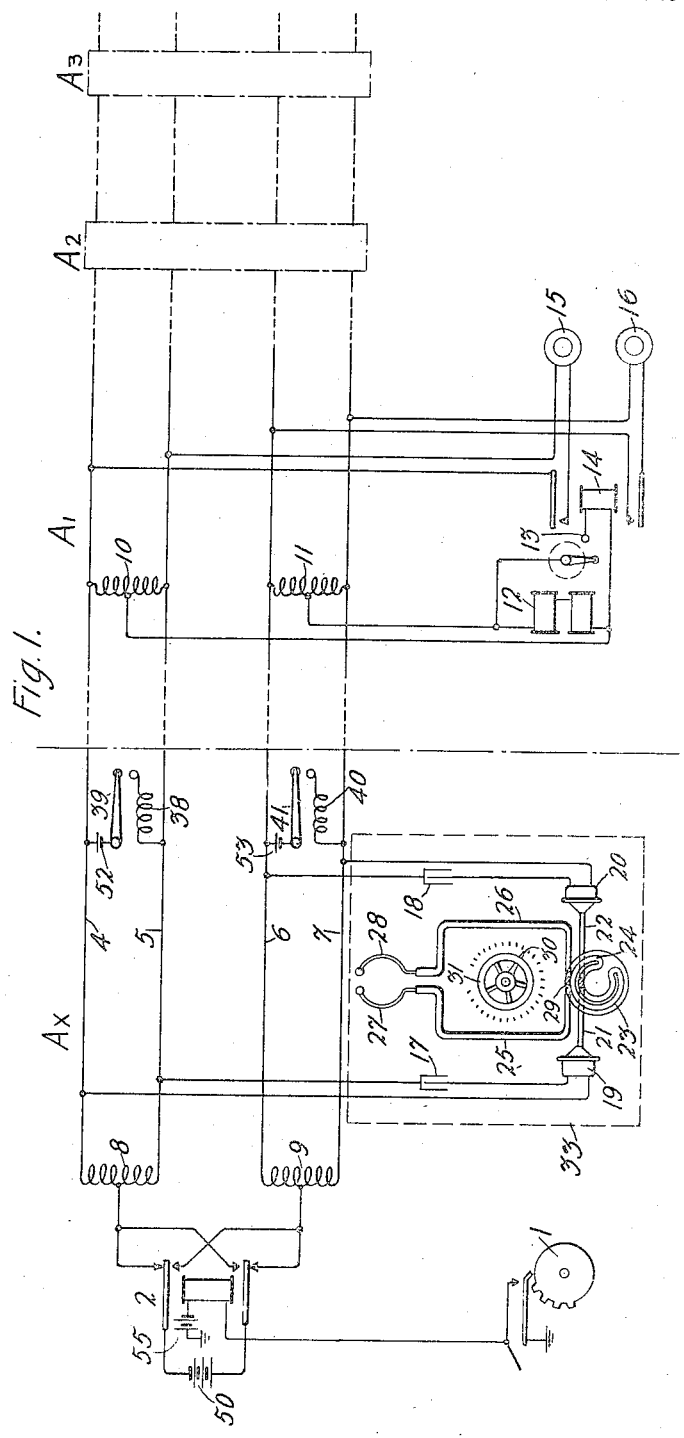

Feb. 12, 1924.  1,483,790

G. D. EDWARDS

METHOD AND SYSTEM FOR DETECTING SOURCES OF VIBRATION

Filed Sept. 15, 1919

Inventor:
George D. Edwards.
by J. E. Roberts
Att'y.

Patented Feb. 12, 1924.

1,483,790

UNITED STATES PATENT OFFICE.

GEORGE D. EDWARDS, OF EAST ORANGE, NEW JERSEY, ASSIGNOR TO WESTERN ELECTRIC COMPANY, INCORPORATED, OF NEW YORK, N. Y., A CORPORATION OF NEW YORK.

METHOD AND SYSTEM FOR DETECTING SOURCES OF VIBRATION.

Application filed September 15, 1919. Serial No. 323,973.

*To all whom it may concern:*

Be it known that I, GEORGE D. EDWARDS, a citizen of the United States, residing at East Orange, in the county of Essex, State of New Jersey, have invented certain new and useful Improvements in Methods and Systems for Detecting Sources of Vibration, of which the following is a full, clear, concise, and exact description.

This invention relates to methods and systems for detecting sources of vibrations and more particularly to those used in detecting the presence of marine or submarine vessels.

In such systems especially those in which certain areas are equipped with a plurality of groups of submerged vibration detectors responsive to mechanical vibrations propagated through the water from a submarine or other source, it is desirable to provide means whereby the areas may be quickly and easily explored and the exact location of a source of vibration may be readily established.

In the so-called binaural method of locating sources of vibration, which has been used to advantage in this connection, the direction of such source may be determined by a comparison of the effects produced by such vibrations upon the ears of an observer. It has been demonstrated that a source of sound placed directly in front of the observer produces a sense of balance, known as a binaural balance, due to the simultaneous arrival of identical sounds at the two ears of the observer whereby the observer unconsciously decides that the source is directly ahead.

Heretofore, it has been proposed to employ this sense of balance in determining the direction of a source of vibration relative to a base line interconnecting a pair of fixedly positioned vibration detectors. In such a method, the vibrations or some effects thereof are caused to reach the observer's ears simultaneously by altering the relative effective lengths of the two paths for their transmission, and by noting the relation of the lengths of the altered paths, it has been possible to determine the angular relation of the source to such base line. One way in which this result has been accomplished is to employ a pair of detecting devices which translate the vibrations into variations in the conditions of independent electrical circuits leading to telephone receivers or similar devices which retranslate the electrical variations into audible effects, which effects are conducted to the ears of the observer over independent sound paths, the lengths of which may be varied. In other words, the relative lengths of the sound paths are varied to compensate for any difference in the time of arrival of the vibrations at the individual detectors of the pair.

In one so-called binaural method for the location of marine or submarine vessels which has been proposed, fixedly positioned groups of vibration detectors are employed which are so associated with an observing station that the observer may binaurally balance the effects of the vibrations upon any pair of any group of detectors and thus determine the relation of the source to the base line of the selected pair.

In some cases, especially in the case of rapidly moving sources, it is desirable to quickly and accurately locate the source or determine the course thereof.

It is one object of this invention to provide an improved system of this nature in which the location of the source may be readily and definitely established.

A further object of the invention resides in a method of exploring an area provided with a system of this nature.

In order to attain these objects in accordance with one feature of the invention, a plurality of independent and substantially parallel paths are provided, each leading from an observer to a plurality of fixed groups of detectors adapted for selective association in pairs with the proper path so that binaural balances may be obtained simultaneously by a plurality of observers through detector pairs associated with independent paths. More specifically, each of a plurality of substantially parallel independent circuits leading from a binaural observation station to a plurality of groups of detectors is provided with means for selectively associating the detectors in pairs therewith for binaural observation. The groups of detectors are so placed that a series of successively right-angled base lines of the proper length dependent upon the reliable detecting ranges of the detectors, interconnect the successive groups of the adjacent parallel circuits.

In accordance with another feature of the invention, a method of exploring an area is provided whereby a rapid exploration may be made of such area to determine the presence therein of sources of vibration, by the selective association of detectors with one observing station, the absolute location of a detected source being established by the simultaneous binaural observation by a plurality of observers of the response thereto of a plurality of pairs of detectors associated with independent observing paths. Since this method of determining the position of the source depends upon the intersection of lines leading thereto from two separate detecting stations, it is clear that the accuracy thereof depends upon the angularity with which these lines intersect. Maximum accuracy in determining the location of a source of sound is attained when the direction lines as ascertained by the binaural sets intersect at right angles, but as the direction lines move from said positions towards positions at right angles to or parallel to the base line, the accuracy decreases. Therefore it is obvious that the area within which the position of a source of vibration may be determined with reasonable precision by observations of the response of two fixed detecting stations is limited and that the precision is extremely low if the source is approximately in line with the two stations. However, this condition is met in the present invention by the provision of another base line substantially at right angles to that interconnecting the above-mentioned pair of stations which may be readily accomplished by adding a third detecting station at the proper point. Thus if a source of vibration is approximately in alignment with the first-mentioned pair of detecting stations, it will in general be so situated as to permit the determination of its position with considerable accuracy from an adjacent base line at right angles thereto. In order to provide means for accurately determining the position of a source of vibration within any portion of a considerable area, a series of right angled base lines may be established throughout the entire area.

Figure 2:
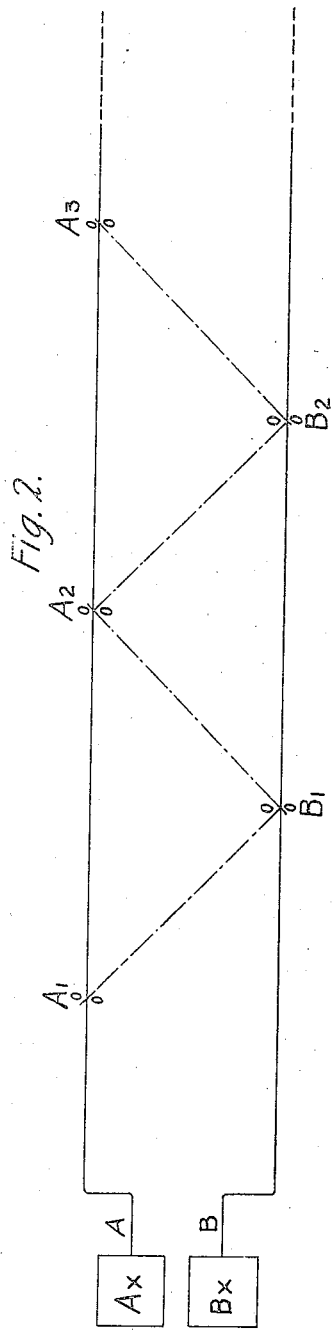

These and other features of the invention, not specifically mentioned above, will clearly appear from the following specification and the accompanying drawing in which Fig. 1 shows one embodiment of the invention, as applied to one observing circuit of a submarine detection system, and Fig. 2 shows diagrammatically the distribution and relative arrangement of the various detectors associated with the plurality of similar observing circuits located within the area to be explored.

Referring more particularly to Fig. 1 of the drawings, an observer's station AX, which may be located at any suitable point on the shore, is provided with a sending device 1 of any suitable type associated with a current reversing relay 2 for controlling the application of reversed current selecting impulses to a phantom circuit composed of conductors 4, 5, 6 and 7, and simplexing coils 8 to 11 inclusive, such as shown in Patent No. 1,278,282, September 10, 1918. The phantom circuit extends to a plurality of detecting stations such as A-1, A-2 and A-3 and a plurality of sending devices similar to that shown at 1 are provided at the observer's station AX for selectively impressing the proper series and arrangement of impulses upon the phantom circuit to cause the individual response of the various selectors at the different stations. At each detecting station, a step-by-step switching device or selector 12 is provided which may be of any suitable type responsive to current impulses of alternating polarity and adapted to selectively close a contact 13 in response to a predetermined series of such impulses received over the phantom circuit. The selectively operated circuit controlling device disclosed in Patent 1,343,256, granted June 15, 1920, to Joseph C. Field may be used to advantage in this connection. The closure of the contact 13 bridges a relay 14 at the selected station across the phantom circuit for connecting detectors 15 and 16 thereat across the physical lines or side circuits composed of conductors 4—5 and 6—7 respectively. The detectors and the associated apparatus at the detecting station may be supported upon a tripod or any other suitably submerged framework properly anchored in a substantially fixed position such as shown in the G. F. Atwood Patent No. 1,432,945, Oct. 24, 1922. The detectors may be of any suitable type for varying the electrical characteristics of associated circuits in response to mechanical vibrations propagated through the water. A binaural observation and compensating set 33 at the observing station AX comprises a pair of receivers 19 and 20 associated through condensers 17 and 18 with physical lines 4—5 and 6—7 respectively. Sounds produced by receiver 19, in response to electrical variations caused by a detector associated with the physical line 4—5 are carried to the ear piece 27 through variable length air tube 23 and fixed length air tubes 21 and 25, while sounds produced by receiver 20, in response to electrical variations caused by a detector associated with physical line 6—7 are carried to the ear piece 28 through variable length air tube 24 and fixed length air tubes 22 and 26. A hand wheel 31 controls the position of a movable stop member 29 which adjusts the relative effective lengths of the air tubes 23 and 24, the position of such member being indicated at any time by the pointer 30 in its relation to an appropriate scale. A compensator of this type is disclosed in the application Allen et al., Serial No. 306,408, filed June 24, 1919.

In Fig. 2 substantially parallel phantom circuits A and B are diagrammatically shown extending from separate observing stations AX and BX, which stations may be and preferably are, adjacent, to provide for the proper interchange of information between the observers. Each of the circuits A and B is provided with apparatus similar to that shown in Fig. 1. The detecting stations on the adjacent lines are staggered so that successive interconnecting lines between the stations on adjacent lines are substantially at right angles to each other. This gives the proper spacing to insure accuracy of observation. The base lines of the detector pairs may have any position relative to the phantom circuits A and B depending upon the area to be patrolled. In the case of exploring a river, the detector pairs are so placed that their base lines are at right angles to the phantom circuits as shown in Fig. 2, but if the phantom circuits are stretched across the mouth of the harbor, the base lines of the detector pairs will be parallel to the circuits.

It is thought that the nature of the invention may be more fully comprehended from the following description of the operation of the system shown on the drawings.

Assuming that switches 39 and 41 are closed and that it is desired to explore the protected area, the observer at station AX may actuate one of the plurality of senders, such as sender 1, thereby operating relay 2 over a circuit extending from battery 55, through the winding of relay 2, and the contact of sender 1 to ground, each time the spring of the sender engages a tooth of the wheel thereof and releasing such relay upon the subsequent disengagement of the spring from such tooth, thus transmitting a predetermined series and arrangement of successively reversed current impulses from battery 50 over the phantom circuit A. The selectors at stations A-1, A-2 and A-3, as well as any other stations that may be associated with the circuit A, advance step by step in response thereto, and upon the completion of the series, the selector at station A-1, which is arranged to be mechanically retained in its predetermined position in response to such series, closes its contact 13. However, all other selectors restore to normal since they are not adjusted for such a series. Relay 14, thereby being bridged across the phantom circuit, operates, due to the current supplied thereto from battery 50, through the normal contacts of relay 2. A circuit is thereupon completed to supply battery to detector 15 at station A-1 extending from one side of battery 52, through conductor 4, upper contact of relay 14, current-varying device of detector 15, conductor 5, retardation coil 38, and contact of switch 39 to the other side of battery 52. A similar circuit is also completed from one side of battery 53, through conductor 6, lower contact of relay 14, current-varying device of detector 16 at station A-1, conductor 7, retardation coil 40 and contact of switch 41 to the other side of battery 53. The vibrations of detectors 15 and 16 cause varying currents to flow through condensers 17 and 18 and the winding of receivers 19 and 20 respectively, and the sounds produced by such receivers are transmitted to the ear pieces 27 and 28 through air tubes 21—23—25 and 22—24—26. If the observer hears no characteristic sound of interest when listening binaurally to the ear pieces 27 and 28, the observer actuates a sender (not shown) similar to sender 1 but arranged to transmit a preliminary set of impulses from battery 50 to release any mechanically retained selector on line A, followed by another series of impulses to cause the selector at station A-2 to connect the associated detectors thereat to the physical line circuits. In this manner, the detectors at each detecting station on the line A may be selectively associated with the observer's station AX and the sounds emitted by the ear pieces observed binaurally.

Upon noting a sound of interest, the observer at station AX requests the observer at station BX to select a predetermined detecting station on the line B, which is properly related to the station already selected on line A. Upon a predetermined signal both observers simultaneously obtain binaural balances with respect to the vibrations as they affect the selected detectors. Thus, the observer at station AX rotates the handwheel 31 in the proper direction to shift the movable stop member 29 to increase the effective length of one variable length air path and to correspondingly decrease the length of the other air path until the observer receives the impression that the source is directly ahead. From the position of the pointer 30 with respect to the associated graduated scale, the observer then determines the angular relation of the source of vibration to the base line joining the detectors 15 and 16. The observer at station BX simultaneously compensates in a similar manner for the difference in time of arrival of the vibrations at the detectors of the selected pair associated with the line B, thereby determining the angular relation of the source to the corresponding base line at the selected station on the line B. Since the positions of the two selected stations are known, the simultaneous determination of the direction of the source from such stations establishes the absolute position of the source.

Since the precision with which the location of a source may be determined in this manner from a single pair of stations is unreliable in case the source is substantially in the direction of the line interconnecting the selected stations, the observer at station BX, if advisable, may retain station B-1 in a selected condition and advise the observer at station AX to restore station A-1 to normal and to select station A-2. The observers may thereupon in a similar manner, observe the response of the detectors at station B-1 and A-2.

In this manner, by the provision of a suitable number of detecting stations at the ends of successively right angled base lines, as shown in Fig. 2, an area may be adequately protected, since in any case a pair of stations is available from which the absolute position of a source may be determined with reasonable precision.

What is claimed is:

1. In a system for the location of a source of vibration, a plurality of substantially parallel pairs of independent transmission line circuits, a binaural observing station associated with each pair of line circuits, a plurality of pairs of vibration detectors spaced along each pair of line circuits, the corresponding pairs of detectors for adjacent pairs of line circuits being so positioned that the lines interconnecting the successive pairs of detectors on the adjacent pairs of line circuits are substantially at right angles and of a predetermined length, and means for selecting and simultaneously observing from separate observing stations the response to the vibrations emanating from the source by pairs of detectors associated with the pairs of transmission line circuits whereby the location of the source relative to the interconnecting base line is determined.

2. In a system for the location of a source of vibration, a plurality of pairs of vibration detectors located at the ends of base lines successive ones of which are at right angles to each other, a plurality of observing stations, and means for simultaneously subjecting the pairs to binaural observation from independent observing stations.

In witness whereof, I hereunto subscribe my name this 9th day of August A. D., 1919.

GEORGE D. EDWARDS.